(12) United States Patent
Michelon et al.

(10) Patent No.: US 7,255,552 B2
(45) Date of Patent: Aug. 14, 2007

(54) METHOD AND DEVICE FOR THERMOFORMING OF CONTAINERS

(75) Inventors: Bernard Michelon, Le Chesnay (FR); Dominique Schwab, Versailles (FR)

(73) Assignee: Erca Formseal, Les Ulis (FR)

( * ) Notice: Subject to any disclaimer, the term of this patent is extended or adjusted under 35 U.S.C. 154(b) by 329 days.

(21) Appl. No.: 10/487,512

(22) PCT Filed: Jul. 9, 2002

(86) PCT No.: PCT/FR02/02405

§ 371 (c)(1),
(2), (4) Date: Feb. 23, 2004

(87) PCT Pub. No.: WO03/018294

PCT Pub. Date: Mar. 6, 2003

(65) Prior Publication Data

US 2004/0245679 A1    Dec. 9, 2004

(30) Foreign Application Priority Data

Aug. 23, 2001 (FR) .................... 01 11031

(51) Int. Cl.
*B29C 51/42* (2006.01)

(52) U.S. Cl. .................. 425/384; 425/393; 425/397; 425/398; 425/403.1

(58) Field of Classification Search ................ 425/325, 425/384, 387.1, 393, 397, 398, 400, 403, 425/403.1

See application file for complete search history.

(56) References Cited

U.S. PATENT DOCUMENTS

| | | | |
|---|---|---|---|
| 2,854,694 A * | 10/1958 | Mumford | 264/550 |
| 3,011,212 A | 12/1961 | Marshall et al. | 18/19 |
| 3,235,639 A | 2/1966 | Knowles | 264/92 |
| 3,260,781 A | 7/1966 | Lux et al. | 264/321 |
| 3,470,281 A | 9/1969 | Knowles | 264/94 |
| 3,499,188 A | 3/1970 | Johnson | 18/19 |
| 3,912,438 A | 10/1975 | Padovani | 425/292 |
| 4,228,121 A | 10/1980 | Meadors | 264/291 |
| 4,404,162 A | 9/1983 | Miki et al. | 264/514 |
| 4,409,178 A * | 10/1983 | Ward | 264/544 |
| 4,668,175 A * | 5/1987 | Martin | 425/388 |
| 5,026,338 A * | 6/1991 | Blackwelder et al. | 493/158 |
| 6,682,675 B1 * | 1/2004 | Vandangeot et al. | 264/161 |

FOREIGN PATENT DOCUMENTS

| | | |
|---|---|---|
| DE | 1157 512 | 9/1960 |
| EP | 0 087 527 A1 | 2/1982 |
| EP | 0 894 610 A1 | 7/1998 |
| FR | 1.307.368 | 9/1961 |
| FR | 2766123 | 7/1997 |
| GB | 1042775 | 2/1964 |

\* cited by examiner

*Primary Examiner*—Yogendra N. Gupta
*Assistant Examiner*—Maria Veronica Ewald
(74) *Attorney, Agent, or Firm*—Sutherland Asbill & Brennan LLP

(57) ABSTRACT

Blanks (12) of thermoplastic material are heated, and a thermoforming step is performed in which the heated blanks are deformed plastically by stretching. Before the thermoforming step, a die-punching step is performed in which the peripheral regions of the blanks are deformed by die-punching while the material of the blanks is held captive on the outside. The installation includes heater means (16) for heating said blanks, thermoforming means (24), and a die-punching tool (26, 28) suitable for deforming the peripheral regions of the blanks before they are thermoformed.

16 Claims, 4 Drawing Sheets

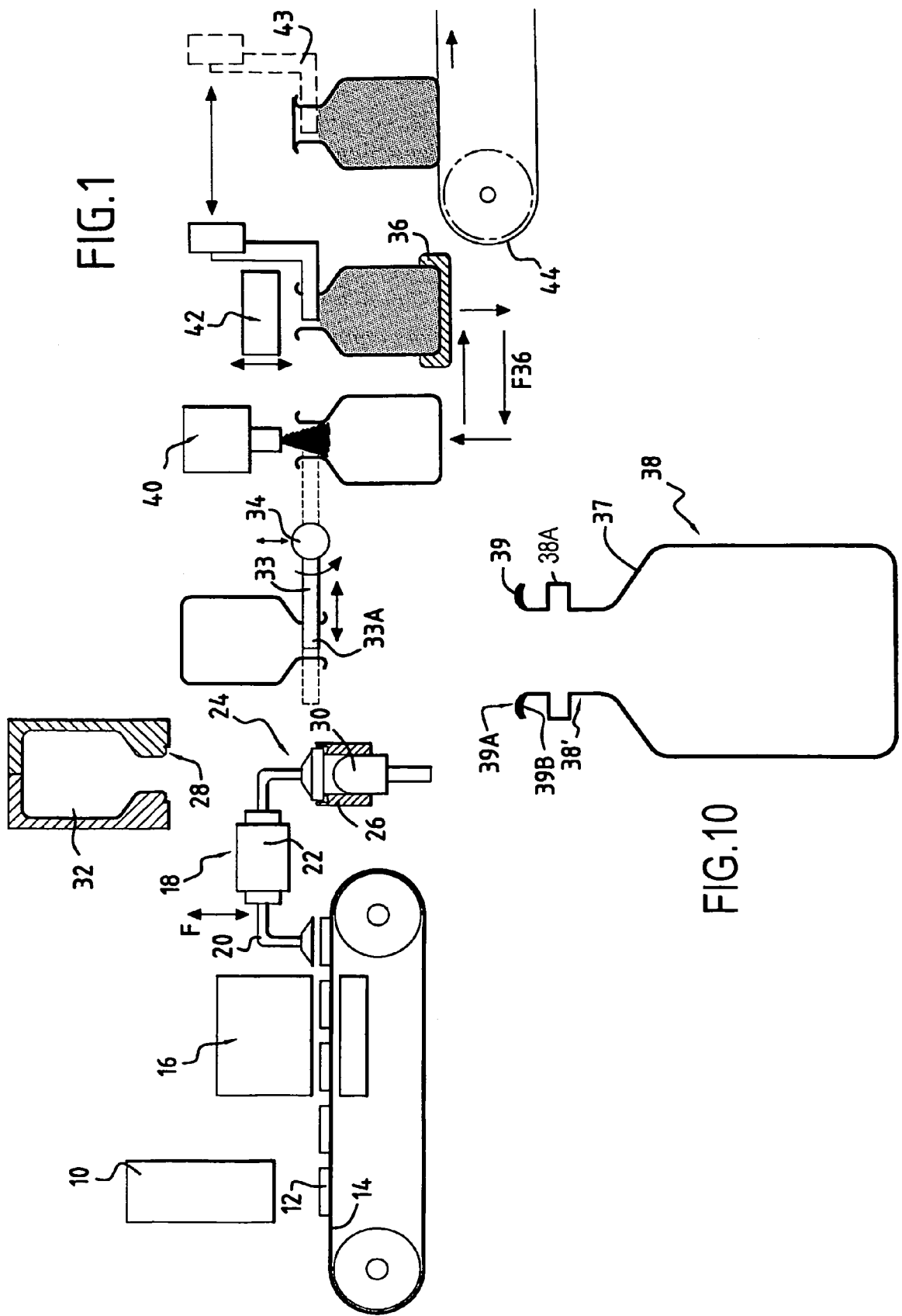

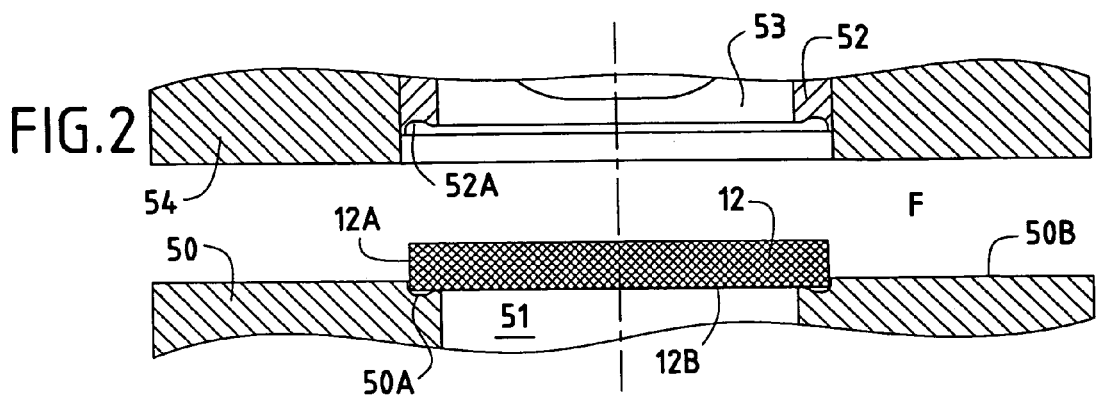
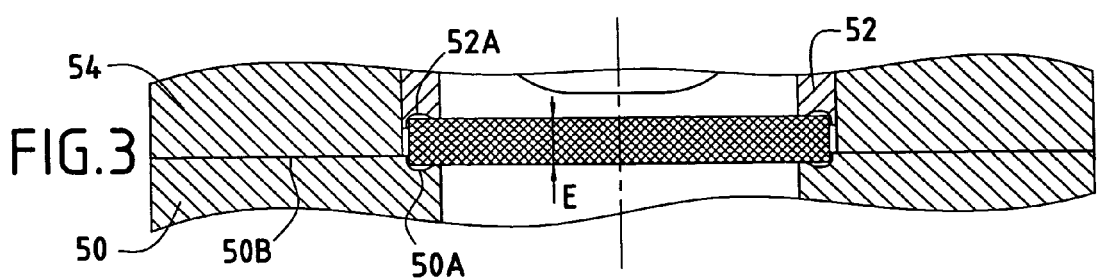
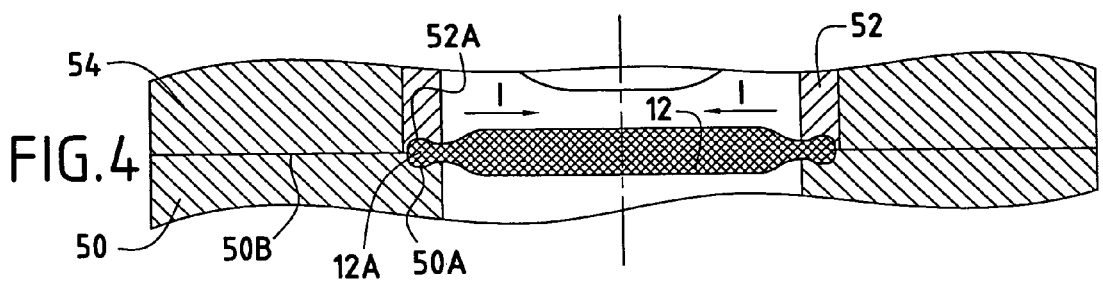
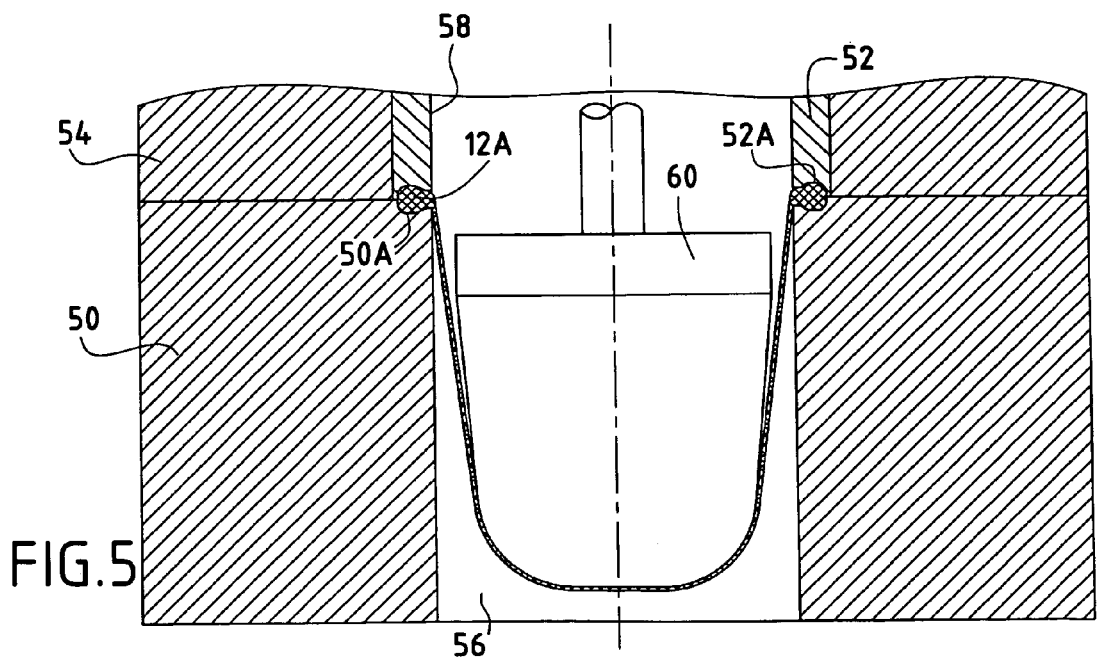

METHOD AND DEVICE FOR THERMOFORMING OF CONTAINERS

CROSS-REFERENCES TO RELATED APPLICATIONS

This application is a national stage entry of PCT/FR02/02405 filed Jul. 9, 2002.

TECHNICAL FIELD

The present invention relates to a method of manufacturing objects such as containers by thermoforming from blanks of thermoplastic material, in which method the blanks are heated and a thermoforming step is performed in which the heated blanks are deformed plastically by stretching.

BACKGROUND OF THE INVENTION

A method of this type is already known from French Patent No. 2 766 123. The method of that French patent is entirely satisfactory, and gives the advantages that stem in particular from the fact that, depending on whether one or more objects are thermoformed from each blank, the use of such blanks makes it possible to avoid or to limit considerably the wastage that exists when a continuous strip of thermoplastic material is used.

Generally, in order to thermoform an object such as a container from a blank, the blank is held in a thermoforming station via its rim, which is not deformed, and a thermoforming step is performed by stretching the central region of the blank to form the body of a container. Thus, the rim of the object, e.g. a container, is constituted by a non-deformed zone of the blank. In general, said zone is flat like the blank is initially, and it is of thickness equal to the initial thickness of the blank, whereas the wall of the body of the container formed from the blank is of a considerably smaller thickness that is a function of the amplitude of the stretching obtained during thermoforming. Thus, the known method of thermoforming from blanks restricts somewhat the geometrical shapes of the rims of the objects obtained by thermoforming.

In addition, depending on the type of object that is to be thermoformed, the initial thickness of the blank is determined so that, after the desired stretching, the body of the object obtained by stretching has a given thickness. For example, the thickness of the wall of the body can be from 10 times smaller than the initial body can be from 10 times smaller than the initial thickness of the blank to 20 times smaller than said initial thickness. However, with the existing method, the thickness of the blank remains unchanged in the region of the rim of the object, and, as a result, in said rim, a quantity of unused material is to be found whereas it is rarely or even never necessary for the rim of such an object to have a thickness as large as the initial thickness of the blank.

An object of the present invention is to improve further the method described by Patent FR 2 766 123 so as to overcome the above-mentioned drawbacks.

SUMMARY OF THE INVENTION

This object is achieved by the fact that, before the thermoforming step, a die-punching step is performed in which, with the material of the blanks being held captive on the outside, the peripheral regions of the blanks are deformed by die-punching.

The die-punching step makes it possible to impart the desired geometrical shape to the rim of the object whose body is formed by thermoforming. In particular, this step makes it possible to impart to said rim a shape that is not flat, e.g. a shape such that the rim has a convex top surface. When the object formed by thermoforming is a container for containing a beverage, such a convex rim greatly enhances user comfort while the user is consuming the beverage by drinking it directly from the container. In general, the die-punching makes it possible to offer considerable freedom as regards the final appearance of the rim of the object formed by thermoforming.

In addition, the die-punching makes it possible to reduce the thickness of the rim relative to the initial thickness of the blank. By die-punching, the material initially present in the zone of the rim comes to fill the cavity formed between the die-punching tools between which the blank is held captive, and the surplus material is naturally pushed back towards the central region of the blank and can thus be used during thermoforming. Thus, die-punching makes it possible to optimize the choice of the parameters constituted by the initial thickness of the blank, by the final thickness of the rim, by the extent of stretching, and by the final thickness of the body of the object.

Since the material of the blanks is held captive on the outside during die-punching (i.e. it is held in the region that will be on the outside of the thermoformed object after thermoforming), the shape of the rim of said object is determined entirely by the die-punching, without it being necessary to cut the rim after thermoforming. It is thus possible to avoid generating wastage by imparting the final shape to the rim from the outset.

Advantageously, before the die-punching step, at least the peripheral regions of the blanks are heated.

This heating makes it possible to take advantage of the thermoplastic behavior of the material of which the blank is made for the purpose of facilitating the die-punching step. In particular, it makes it easier for the material to creep towards the central region of the blank as indicated above.

The blanks, which are initially rigid, but which can be softened by heating, lend themselves very well to the die-punching operation.

Advantageously, during the die-punching step, for each blank, a die is used that supports the peripheral region of the blank, and the blank continues to be supported by said die at least during the thermoforming step.

The blank that has just been subjected to the die-punching is supported fully by the die, even during the thermoforming step.

Thus, advantageously, each blank is die-punched between the die and a punch, and, during the thermoforming step, the blank is held between said punch and said die.

The die and the punch constitute particularly effective holding means for holding the blank during the thermoforming step. In addition, the fact that the die-punched rim continues to be held between the die and the punch for a few instants after the die-punching operation proper makes it possible to stabilize the shape of the die-punched rim. In particular, if the blank has been pre-heated, it is thus possible to hold the die-punched rim until it cools a little, without that delaying the thermoforming step which takes place after the die-punching.

Advantageously, for each blank, the die-punching step is performed and then, without moving the blank, the thermoforming step is performed.

The thermoforming is thus performed almost continuously with the die-punching, and therefore very quickly, which makes it possible to achieve high production throughput.

The invention also provides an installation for manufacturing objects such as containers by thermoforming from blanks of thermoplastic material, said installation including heater means for heating said blanks, and thermoforming means suitable for plastically deforming the heated blanks by stretching.

An installation of this type is known from French Patent No. 2 766 123. The installation of that French patent is entirely satisfactory but, as indicated above in connection with the method, it does not make it possible to choose the geometrical shape of the rims of the objects obtained by thermoforming, nor to optimize the use of the quantity of the material that constitutes the blank, because the material constituting the rim remains unused, and of thickness equal to or substantially equal to the initial thickness of the blank.

An object of the invention is to provide an installation that overcomes those drawbacks.

This object is achieved by the fact that the installation of the invention includes a die-punching tool suitable for deforming the peripheral regions of the blanks before they are thermoformed, said tool co-operating with means for holding the blanks captive during the die-punching.

This die-punching tool can be made very simply and inexpensively. It is disposed along the path of the blanks through the installation, but no further along than at the thermoforming station. Such a tool, associated with the means for holding the blank captive during die-punching makes it possible, almost without losing any time and without excessive tool costs, to optimize the use of the material constituting the blank and to impart to the rim of the thermoformed object its final shape, as indicated above in connection with the method.

Advantageously, the die-punching tool includes a die having a die-punching edge suitable for supporting the peripheral region of a blank while providing an empty space in register with the central region of the blank, and said die constitutes a support for the blank in the thermoforming station.

The die is an effective support for the blank in the thermoforming station and it does not hamper operation of said thermoforming station because it provides an empty space in register with the central region of the blank that is deformed by a piston during the thermoforming.

Thus, advantageously, the die-punching tool includes a die-punching punch which is suitable for being moved between an active position in which it is brought towards the die for performing the die-punching of a blank by co-operating with a peripheral region of said blank carried by the die, and an inactive position, in which it is spaced apart from the die, the die and the die-punching punch being disposed in the thermoforming station and forming means for holding the blank in said station.

By disposing the die and the die-punching punch in the thermoforming station, it is possible to avoid the presence of the die-punching means modifying the overall size of the installation. Optionally, the die and the die-punching punch can be put in place in an existing installation, of the type described in French Patent No. 2 766 123, almost without modifying any tools of the installation other than the thermoforming station.

Advantageously, the installation includes a wedge piece defining an opening in which a blank can be wedged by being placed on the die-punching edge.

Said piece is advantageously carried elastically by the body of the die, and can be pushed back into a setback by the punch.

Advantageously, the thermoforming station comprises a thermoforming piston and a thermoforming chamber situated facing each other, the piston being suitable for being moved between a thermoforming position in which it penetrates into the chamber and a retracted position in which it is spaced apart from said chamber, and said installation includes control means for successively causing the die-punching punch to move from its inactive position to its active position, and the thermoforming piston to move from its retracted position to its thermoforming position, and then back to its retracted position, and the die-punching punch to move from its active position to its inactive position.

In order to perform the thermoforming, it is necessary to hold the blank firmly, in order to prevent it from being moved during the stretching operation which is performed by the thermoforming. In general, the blank is then nipped between the edge of the thermoforming chamber and the edge of a cylinder in which the thermoforming piston moves when it is out of said chamber. In known installations, those edges are flat and they nip the rim of the blank without deforming it. With the invention, the die-punching punch is used, with the die, not only as a die-punching tool but also as a nipping tool so as to hold the blank during the thermoforming. The punch and the die are moved relative to each other analogously to the manner in which, in conventional installations, the thermoforming chamber and the cylinder are moved, the thermoforming piston moving in said cylinder when it is outside said chamber. In this way, the die-punching takes place without any time being lost compared to the time required in conventional installations.

In a first advantageous variant, the thermoforming chamber is disposed above the thermoforming piston, and the die is formed in the wall of a cylinder into which the piston is returned in its retracted position, while the die-punching punch co-operates with an edge portion of the thermoforming chamber, i.e. said punch can be carried or supported by such an edge portion, while being mounted to move relative thereto, or it may be fixed to such an edge, or may even be integral therewith.

In which case, the objects such as containers are thermoformed with their bodies extending upwards relative to their rims. As indicated in French Patent No. 2 766 123, this configuration is particularly advantageous when the thermoformed objects are containers whose manufacture must comply with very stringent hygiene rules. In which case, there is no risk of dust being deposited on the edge of the opening or inside the container. When the installation includes a filling station for filling the containers, the containers are grasped by pick-up means and turned the right way up so as to be suitably disposed on a conveyor, with their openings facing upwards, before going into the filling station. In other words, the openings in the containers remain facing downwards until it becomes necessary to turn them the right way up for the purpose of filling them.

In another advantageous variant, the thermoforming piston is disposed above the thermoforming chamber, and the die is formed by an edge portion of the thermoforming chamber, while the die-punching punch co-operates with an edge portion of a cylinder into which the piston is returned in its retracted position.

In which case, more conventionally, the containers are thermoformed with their bodies extending downwards relative to their rims.

Both of the above-mentioned thermoforming directions are entirely compatible with the presence of the die-punching tools.

The invention also provides an object such as a container having a body formed by thermoforming a thermoplastic material. The object, obtained by implementing the method of the invention and/or by using the installation of the invention, has the particularity of further having a die-punched rim.

The objects such as containers that are formed by thermoforming may be formed from a thermoplastic strip or from blanks. In both cases, with known systems, the objects have flat rims corresponding to the plane of the thermoplastic strip or to the plane of a marginal zone of the blank. In both cases, the rim of each container has a thickness substantially equal to the thickness of the thermoplastic strip or of the blank prior to thermoforming. As indicated above, said rim has a thickness that may be from 10 times greater than the thickness of the body of the objects to 20 times greater than said thickness of the body, as a function of the extent of stretching by thermoforming. The rim is thus relatively thick and corresponds to a quantity of material that is not used.

An object such as a container that is formed by thermoforming with a die-punched rim is exempt from those drawbacks because, firstly the rim can have a non-flat shape because of the die-punching, and secondly the die-punching makes it possible to limit the thickness of said rim relative to the initial thickness of the blank from which it is thermoformed.

Advantageously, the die-punched rim has a convex top face.

When the thermoformed object is a container containing a beverage, such a rim having a convex top face improves the possibilities of pouring the beverage contained in said container, and also improves comfort for a user drinking the beverage directly from the container.

These and other features of the present invention will become apparent upon review of the following detailed description of the preferred embodiments when taken in conjunction with the appended claims.

BRIEF DESCRIPTION OF THE DRAWINGS

The invention will be well understood and its advantages will appear more clearly on reading the following detailed description of an embodiment shown by way of non-limiting example. The description refers to the accompanying drawings, in which:

FIG. 1 is a general view of an installation of the invention, making it possible to implement the method of the invention;

FIGS. 2 to 4 show various stages in the die-punching step;

FIG. 5 shows the start of the thermoforming step in two variants;

FIG. 10 shows an example of a container of the invention.

DETAILED DESCRIPTION OF THE INVENTION

Figure 6:
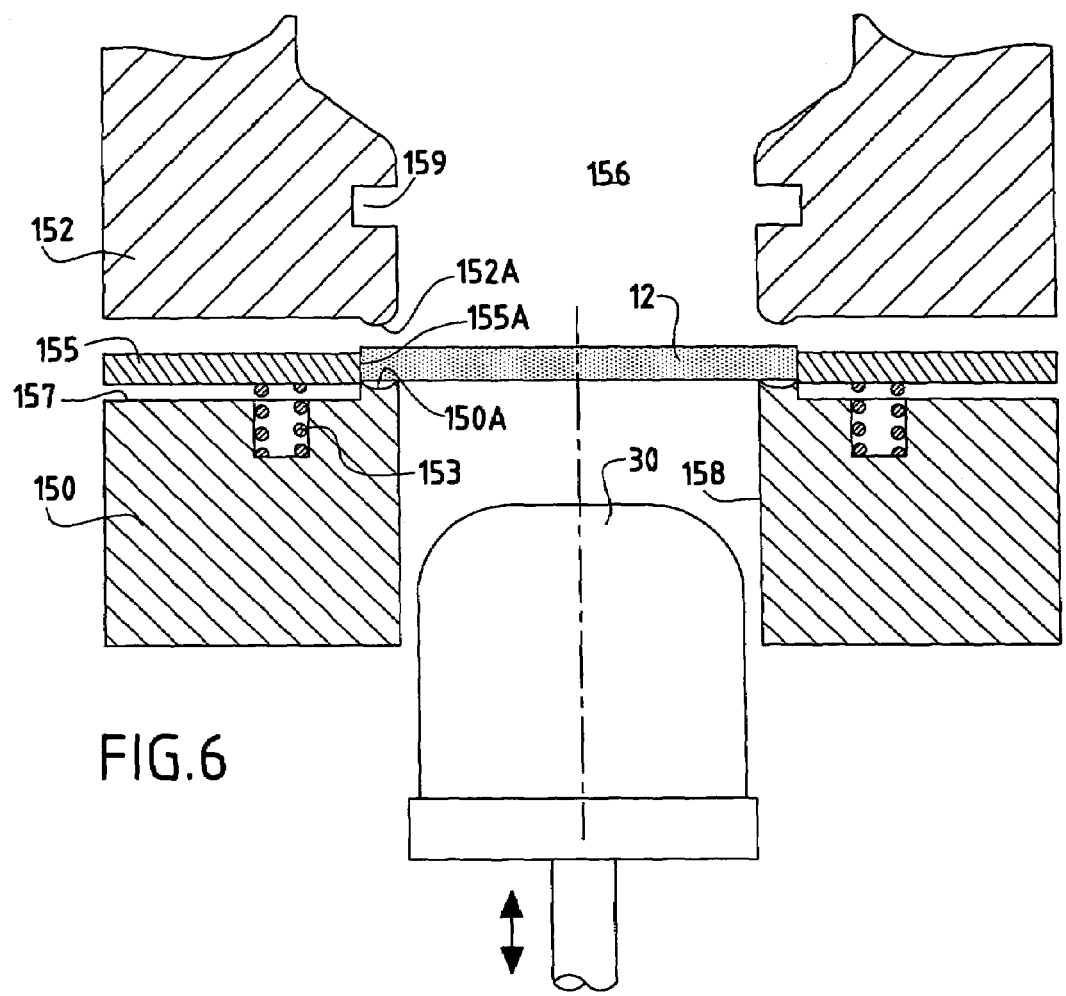
FIGS. 6 and 7 show the situation prior to die-punching and prior to the start of thermoforming in another variant.

The installation shown in FIG. 1 includes a feed station 10 which makes it possible to dispose blanks 12 of a thermoplastic material on a conveyor 14 which drives said blanks through heater means 16 making it possible to heat said blanks to their thermoplastic deformation temperature. At the outlet of the heater means, the hot blanks are picked up by pick-up means of a transfer station 18. For example, said transfer station has suction-cup arms 20 carrying, for example, Teflon disks suitable for picking up the blanks by suction, almost without cooling them at all.

As indicated by the double-headed arrow F, the arms can be moved vertically to pick up the blanks and to raise them. For example, the arms are secured to or integral with a turnstile 22 which drives them so as to place them in a die-punching station 24. In this situation, the arms can be lowered and the suction can cease so as to place the blanks on a die 26 above which a die-punching punch 28 suitable for being moved upwards to enable the arm 20 to be positioned in the die-punching station, and to enable the blank to be put in place in said die-punching station, and for being moved downwards so that, by co-operating with the die 28, it performs die-punching on the edge of the blank.

In the example shown, the die-punching station also serves for thermoforming, and the thermoforming is performed upwards by means of a thermoforming piston 30 that is mounted to move in a cylinder whose edge forms or carries the die 26, while the thermoforming chamber 32 is disposed above the piston, and while its bottom edge carries or forms the die-punching punch 28.

After the thermoforming, once the thermoforming chamber has been moved away from the thermoformed containers, said containers are transferred to the downstream portion of the installation.

For example, the container 38 which has just been thermoformed is picked up by means of tongs 33A equipping the free end of a retractable arm 33. The arm is extended to grasp the container in the thermoforming station, and then retracted to move it away therefrom.

In the example shown, the containers are thermoformed with their bodies extending upwards, and they must be turned the right way up in order to be filled and then closed. For this purpose, the arm 33 is mounted on a pivotally mounted support 34 which, once the container has been moved away from the thermoforming station, causes the arm to pivot through one half turn in a vertical plane so as to turn the container the right way up. The support 34 can be mounted to move back and forth vertically so that, once the arm 33 has grasped the container in the thermoforming station, it can move it away from the bottom tool of said thermoforming station.

The container as turned the right way up, still carried by the arm 33, is disposed in the filling station 40. It can be received by a bottom support 36 which is mounted to move along the sides of a rectangle as indicated by the arrows F36 so as be placed under the filled container, so as to support it, and so as to bring it by moving horizontally into a station 42 in which lids or caps are put on and sealed. At the outlet of said station, the container is received by another arm 43 having tongs, which arm places the container on a final conveyor 44 enabling it to be removed from the installation and to be packaged.

In the example shown, the entire blanks 12 are heated fully in the heater means 16 before they are disposed in the die-punching station which also performs the thermoforming.

Alternatively, it is possible to make provision for the blanks to be heated over their peripheries only or else to be heated, but only to a temperature lower than the temperature necessary for performing the thermoforming by stretching the blanks through the amplitude desired for forming the objects, before the blanks are disposed in the die-punching means, and to make provision for the central regions of the blanks to be heated to the thermoforming temperature at the outlet of said die-punching means, and after the die-punching has been performed, but before said blanks are subjected to the thermoforming operation.

However, the example shown in FIG. 1 is advantageous because it makes it possible to simplify the tooling required, and makes it possible to achieve high production throughput.

It is also possible to perform the die-punching step by hot die-punching, using a die-punching tool that has at least one heated portion. For example, the die and/or the die-punching punch can be heated. However, the use of a cold die-punching tool makes it possible to ensure that stabilization of the deformation obtained by die-punching is faster.

Since the blanks 12 might cool slightly while they are being transferred from the conveyor 14 to the thermoforming station 24, it is advantageous for the stretch piston 30 to be a heater piston.

In the example of FIG. 1, the means for driving the blanks and then the containers comprise the belt conveyor 14 and transfer means having pivotally and/or slidably mounted arms.

Figure 9:
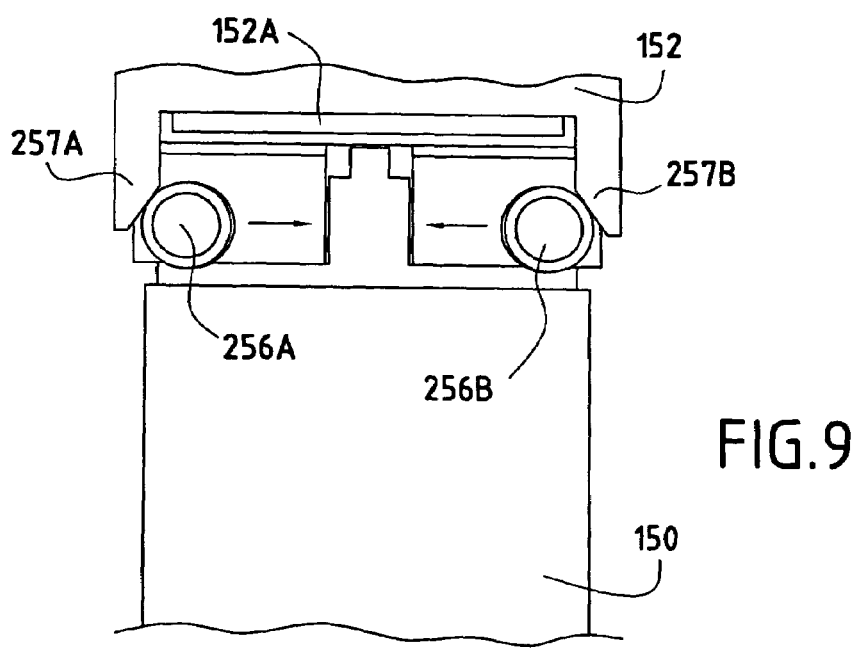
FIG. 9 shows the die of FIG. 8 and its punch as it is moving towards said die.

The invention is also applicable to an installation having other means for driving the blanks, e.g. a carrousel installation of the type shown in FIG. 9 of French Patent No. 2 766 123.

With reference to FIGS. 2 to 4, the die-punching step is described below in more detail. The blank 12, which initially has a substantially constant thickness, is disposed on a die 50 which has a die-punching edge 50A on which the peripheral region 12A of the blank 12 rests. The die is made so that an empty cylindrical zone 51 is preserved under the central region 12B of the blank, the die-punching edge having an annular shape.

The thermoforming punch 52 is mounted to move vertically relative to the die 50. Said thermoforming punch is provided with an active edge 52A situated vertically in alignment with the die-punching edge 50A, and said thermoforming punch is provided with an empty internal zone 53 situated in register with the space 51. The punch 52 co-operates with a body 54 by being fixed in a central recess in the body 54 while being capable of being moved vertically relative to said body. The body 54 can be moved vertically to come to rest against the top face 50B of the die 50 formed in a region of the die that excludes the die-punching edge 50A. FIG. 2 shows the body 54 and the punch 52 in the inactive position, in which the punch is spaced apart from the die. It is in this position that the blank 12 can be put in place on the die.

FIG. 3 shows the stage in which the body 54 has been lowered, so as to rest on the top face 50B of the die to form a join plane. However, in this situation, the die-punching punch 52 is still substantially in its inactive position, because the minimum distance between the active edge 52A of said punch and the die-punching edge 50A remains substantially equal to the ordinary thickness E of the blank 12.

Thus, in the situation shown in FIG. 3, the blank 12 is held captive between the die 50, the body 54, and the punch 52. FIG. 4 shows the end of die-punching, the punch 52 occupying its active position. It can be seen that, in this situation, the peripheral region 12A of the blank 12 has been deformed by die-punching. For example, the shapes of the die-punching edge 50A and of the active edge 52A of the die-punching punch are such that the die-punching imparts the shape of an annular bead to the peripheral region 12A of the blank 12. During this operation, the material of the blank, which material is held captive on the outside, has crept towards the inside of the blank in the direction indicated by arrows I. As a result, regions of slight extra thickness can have formed in the vicinity of the central region of the blank, such regions of extra thickness being used advantageously for "supplying material" during the thermoforming operation that follows die-punching.

The person skilled in the art can conduct tests for determining the quantity of material that creeps, and for verifying the position it takes up at the end of die-punching. The person skilled in the art can therefore choose the initial thickness of the blank optimally as a function of the extent of stretching and of the thickness that is to be imparted to the object as finally obtained. The person skilled in the art can thus use a blank that is slightly thinner than a blank of the same type that is used for thermoforming a container that is analogous but whose edge has not undergone die-punching.

Starting from the situation shown in FIG. 4, the thermoforming can be performed by moving the thermoforming piston from the retracted position that it occupied previously to its thermoforming position. For example, as shown in FIG. 5, the die 50 defines at least a portion of the wall of the thermoforming chamber 56, while the support 54 and the die-punching punch 52 define the cylinder 58 into which the thermoforming piston 60 is retracted in its retracted position. FIG. 5 shows the position of the piston during thermoforming, when it starts to penetrate into the chamber 56 so as to stretch the material of the blank 12. In this situation, the peripheral region 12A of said blank is held securely between the die-punching edge 50A and the active edge 52A of the die-punching punch.

In this example, the thermoforming is performed downwards, i.e. the piston is moved downwards to take up its thermoforming position. With an analogous system, it is possible to perform the thermoforming upwards as in FIG. 1. In which case, the die defines the cylinder 26 into which the piston 30 is retracted in its retracted position, which cylinder is situated under the thermoforming chamber. Said thermoforming chamber is then defined at least in part by the body which carries the die-punching punch 28.

Figure 7:
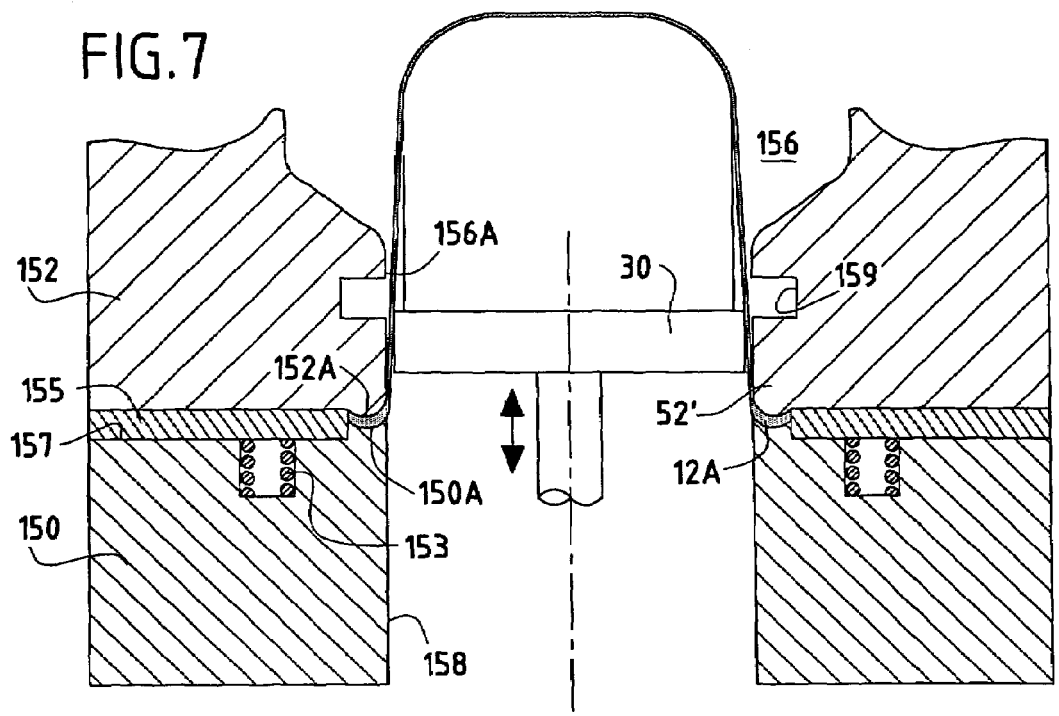

FIGS. 6 and 7 show a variant embodiment for upward thermoforming. In this variant, the die 150 defines the cylinder 158 into which the piston 30 is retracted in its retracted position. The die-punching punch 152 is formed by a portion of the body of the thermoforming chamber 156 whose opening edge forms the active edge 152A of the punch. A wedging intermediate piece 155 defining an opening 155A in which the blank 12 is wedged by being placed on the die-punching active edge 150A is disposed between the die 150 and the punch 152, without interfering between the active edge 152A of the punch and the die-punching edge 150A. Said piece, which is in the shape of an annular wafer, is carried elastically by the body of the die 150, via springs 153.

In FIG. 6, the blank 12 is placed in the opening 155A of the piece 155 and is resting on the die-punching edge 150A, with the punch and the die being spaced apart from each other.

In FIG. 7, the die-punching has been performed, the body of the punch having been moved to push the intermediate piece 155 back into a setback 157 provided between the punch and the die, by compressing the springs, while the active edge of the punch, which edge is situated outside said setback, has pushed the portion 12A of the blank 12 back against the die. The thermoforming starts, the piston 130 pushing back the thermoplastic material of the central region of the blank into the thermoforming chamber 156.

By way of example, in FIGS. 6 and 7, the die-punching edge 150A and the active edge 152A of the die-punching punch are shaped so as to impart to the rim of the container formed in the peripheral region 12A of the blank a shape different from the bead shape of the preceding figures, in which the edges 50A and 52A are concave. In FIGS. 6 and 7, the shapes of the edges 150A and 152A make it possible to impart to the container a corolla-like rim 39 as in FIG. 10, having a top face 39A that is convex, while its bottom face 39B is substantially flat or concave. For this purpose, with the thermoforming being performed upwards, the die-punching edge 150A is concave, while the active edge 152A of the punch is convex or substantially flat.

Figure 8:
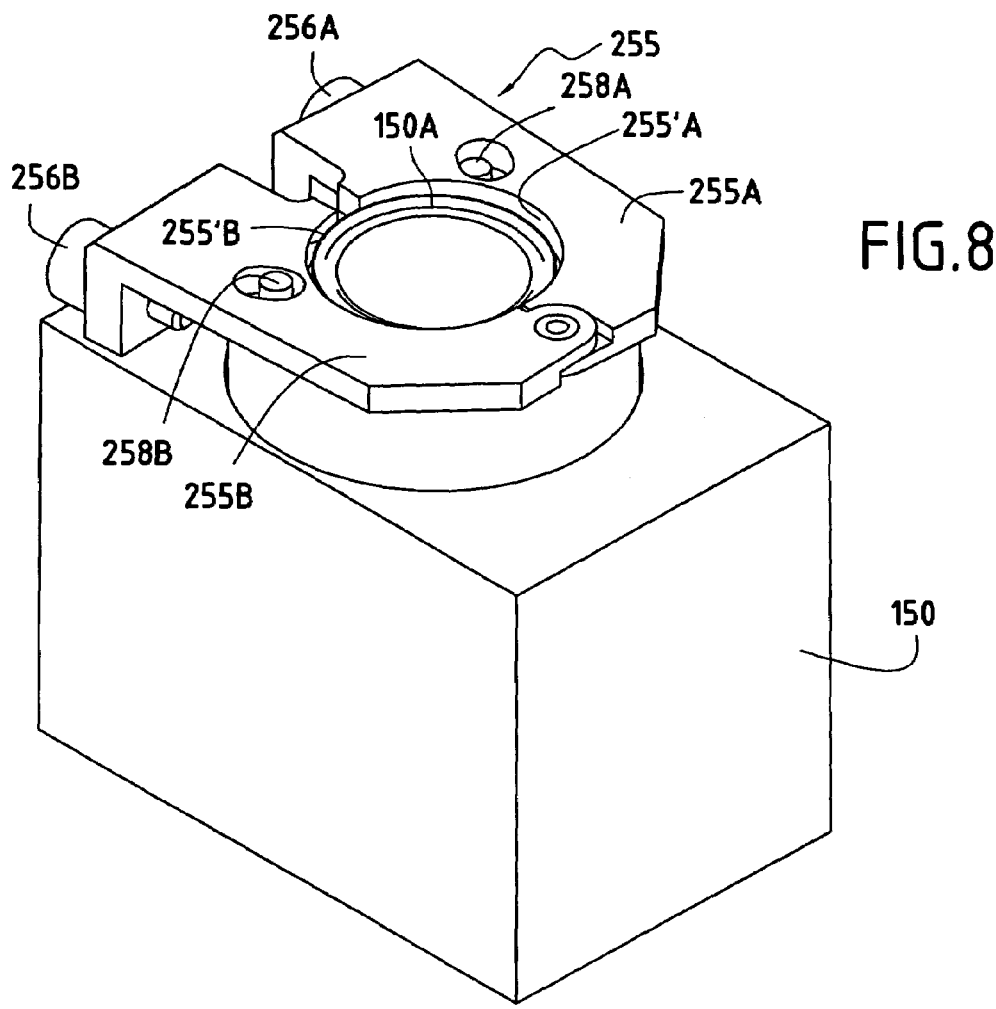
FIG. 8 is a perspective view showing the thermoforming die.

The wall 156A of the thermoforming chamber 156 has an annular or helical groove 159 which, as shown in FIG. 8, makes it possible to give to the wall of the body 37 of the container 38 a bead 38A which makes it possible, for example, to retain tamper-proof means preventing the lid of the container from being removed in untimely manner. If the groove 159 is shaped helically, said bead 38A can be the start of a screw thread making it possible for the cap to be screwed on before it is separated from the container for the first time, for the purpose of consuming any beverage or other substance it contains.

When the thermoforming step is finished, the piston 30 or 60 can be brought back into its retracted position, and the die-punching punch can be brought back into its inactive position, so as to enable the container that has just been formed to be removed from the thermoforming station.

In FIGS. 8 and 9, the die 150 can be identical to the die shown in FIGS. 6 and 7. The wedging intermediate piece 255 is formed by tongs whose two arms 255A, 255B are hinged so that they can move in a plane perpendicular to the direction in which the thermoforming punch moves. Before it is die-punched, a blank can be placed on the die-punching active edge 150A, inside the opening defined by the concave zones 255'A, 255'B facing the two arms of the tongs 255, while said arms are spaced apart as in FIG. 8.

Before the die-punching, the two arms 255A, 255B are brought together so that their concave zones form a closed outline (in particular a circular outline) which imparts the shape of the periphery of the rim of the container to said periphery.

This variant facilitates putting the blank in place correctly on the die-punching active edge even if said blank is slightly deformed after it has been heated and transported. In addition, the tongs being closed shapes the outline of said blank so as to correct any deformation.

For example, each arm carries a respective cam wheel 256A, 256B, and respective fingers 257A, 257B that are carried by the punch 152 co-operate with said wheels via ramps on said fingers as the punch is being brought towards the die to close the arms of the tongs just before the die-punching proper starts.

The arms are urged continuously into their spaced-apart position by resilient means (not shown), said spaced-apart position being limited by respective abutments 258A and 258B.

Like the piece 155 shown in FIGS. 6 and 7, the tongs 255 can be carried elastically by the die so as to retract partially during the die-punching.

If, as shown in FIG. 10, the container 38 has an undercut shape, the thermoforming chamber can be at least partially open in the region corresponding to said undercut in order to make unmolding possible. Then, in order to bring the container into the other stations of the installation, starting with the filling station, transfer means of any known type can be used.

The container 38 shown in FIG. 10 has such an undercut shape. Overall, it is in the shape of a bottle, in which the undercut zone 38' forms the neck. The die-punched rim 39 imparts a convex shape to the edge of the neck, constituting the top face 39A of the rim, which convex shape makes the container more pleasant to use, in particular when the beverage contained in the bottle is drunk directly from the bottle. In the example shown, the bottom face 39B of the rim 39 is concave, which firstly makes it possible to avoid having any unnecessary thickness of material in the region of the rim and secondly optionally constitutes a setback under the rim for receiving a tamper-proofing ring or the like enabling the user to verify that, when said user opens the container, it is indeed the first time that the container has been opened since the cap was put in place. For example, the thermoplastic material used for forming said blanks can be based on polystyrene, on polypropylene, or on polyethylene terephthalate.

It should be apparent that the foregoing relates only to the preferred embodiments of the present invention and that numerous changes and modifications may be made herein without departing from the spirit and scope of the invention as defined by the following claims and the equivalents thereof.

We claim:

1. An installation for manufacturing objects such as containers by thermoforming from blanks of thermoplastic material having a peripheral region and a central region, said installation including heater means for heating said blanks, and a thermoforming station suitable for plastically deforming the heated blanks by stretching;

wherein said installation includes a die-punching tool suitable for deforming said peripheral regions of the blanks before they are thermoformed and a wedge piece for holding the blanks captive during the die-punching, wherein said wedge piece is formed by tongs having two arms that can be opened while the blank is being put in place on a die-punching edge, and said arms can be closed before the die-punching so as to define between them an opening suitable for shaping the outline of the blank before said die-punching.

2. An installation according to claim 1, wherein said die-punching edge is suitable for supporting said peripheral region of a blank while providing an empty space in register with said central region of the blank, and wherein said die constitutes a support for the blank in said thermoforming station.

3. An installation according to claim 2, wherein said wedge piece defines an opening in which a blank can be wedged by being placed on said die-punching edge.

4. An installation according to claim 1, wherein said die-punching tool includes a die-punching punch which is suitable for being moved between an active position in which it is brought towards a die for performing the die-punching of a blank by co-operating with a peripheral region of said blank carried by said die, and an inactive position, in which it is spaced apart from said die, and in that said die and said die-punching punch are disposed in said thermoforming station and form means for holding the blank in said thermoforming station.

5. An installation for manufacturing objects such as containers by thermoforming from blanks of thermoplastic material having a peripheral region and a central region, said installation including heater means for heating said blanks, and a thermoforming station suitable for plastically deforming the heated blanks by stretching;

wherein said installation includes a die-punching tool suitable for deforming said peripheral regions of the blanks before they are thermoformed and a wedge piece for holding the blanks captive during the die-punching, wherein said wedge piece defines an opening in which a blank can be wedged by being placed on a die-punching edge and wherein said wedge piece is carried elastically by the body of a die, and can be pushed back into a setback by said punch.

6. An installation according to claim 4, wherein said thermoforming station comprises a thermoforming piston and a thermoforming chamber situated facing each other, said thermoforming piston being suitable for being moved between a thermoforming position in which it penetrates into said thermoforming chamber and a retracted position in which it is spaced apart from said thermoforming chamber, and wherein said installation further includes control means for successively causing said die-punching punch to move from its inactive position to its active position, and said thermoforming piston to move from its retracted position to its thermoforming position, and then back to its retracted position, and the die-punching punch to move from its active position to its inactive position.

7. An installation according to claim 6, wherein said thermoforming piston is a heater piston.

8. An installation according to claim 6, wherein said thermoforming chamber is disposed above said thermoforming piston, and wherein said die is formed in the wall of a cylinder into which said piston is returned in its retracted position, while said die-punching punch co-operates with an edge portion of said thermoforming chamber.

9. An installation according to claim 6, wherein said thermoforming piston is disposed above said thermoforming chamber, and in that said die is formed in the wall of said thermoforming chambers while said punching punch co-operates with an edge portion of a cylinder into which said piston is returned in its retracted position.

10. An installation according to claim 1, wherein said heater means comprise a heater station at the outlet of which pick-up means are disposed that are suitable for grasping the hot blanks and for placing them in said die-punching tool.

11. An installation according to claim 5, wherein said die-punching tool includes a die-punching punch which is suitable for being moved between an active position in which it is brought towards said die for performing the die-punching of a blank by co-operating with a peripheral region of said blank carried by said die, and an inactive position, in which it is spaced apart from said die, and in that said die and said die-punching punch are disposed in said thermoforming station and form means for holding the blank in said thermoforming station.

12. An installation according to claim 11, wherein said thermoforming station comprises a thermoforming piston and a thermoforming chamber situated facing each other, said thermoforming piston being suitable for being moved between a thermoforming position in which it penetrates into said thermoforming chamber and a retracted position in which it is spaced apart from said thermoforming chamber, and wherein said installation further includes control means for successively causing said die-punching punch to move from its inactive position to its active position, and said thermoforming piston to move from its retracted position to its thermoforming position, and then back to its retracted position, and the die-punching punch to move from its active position to its inactive position.

13. An installation according to claim 12, wherein said thermoforming piston is a heater piston.

14. An installation according to claim 12, wherein said thermoforming chamber is disposed above said thermoforming piston, and wherein said die is formed in the wall of a cylinder into which said piston is returned in its retracted position, while said die-punching punch co-operates with an edge portion of said thermoforming chamber.

15. An installation according to claim 12, wherein said thermoforming piston is disposed above said thermoforming chamber, and in that said die is formed in the wall of said thermoforming chamber, while said punching punch co-operates with an edge portion of a cylinder into which said piston is returned in its retracted position.

16. An installation according to claim 5, wherein said heater means comprise a heater station at the outlet of which pick-up means are disposed that are suitable for grasping the hot blanks and for placing them in said die-punching tool.

* * * * *